United States Patent
Ahuja et al.

(10) Patent No.: US 9,406,137 B2
(45) Date of Patent: Aug. 2, 2016

(54) ROBUST TRACKING USING POINT AND LINE FEATURES

(71) Applicant: QUALCOMM Incorporated, San Diego, CA (US)

(72) Inventors: Dheeraj Ahuja, San Diego, CA (US); Kiyoung Kim, Vienna (AT); Yanghai Tsin, Palo Alto, CA (US); Seyed Hesameddin Najafi Shoushtari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 14/278,928

(22) Filed: May 15, 2014

(65) Prior Publication Data

US 2014/0368645 A1 Dec. 18, 2014

Related U.S. Application Data

(60) Provisional application No. 61/835,402, filed on Jun. 14, 2013.

(51) Int. Cl.
  *G06K 9/00* (2006.01)
  *G06T 7/00* (2006.01)
  *H04N 7/18* (2006.01)
  *G06T 7/20* (2006.01)

(52) U.S. Cl.
  CPC ............. *G06T 7/0044* (2013.01); *G06T 7/2033* (2013.01); *H04N 7/183* (2013.01); *G06T 2207/20021* (2013.01); *G06T 2207/30244* (2013.01)

(58) Field of Classification Search
  None
  See application file for complete search history.

(56) References Cited

U.S. PATENT DOCUMENTS

| | | | | |
|---|---|---|---|---|
| 8,442,305 | B2 * | 5/2013 | Ramalingam | G01C 21/3602 382/154 |
| 8,520,931 | B2 * | 8/2013 | Tateno | G06K 9/00208 382/101 |
| 9,135,513 | B2 * | 9/2015 | Takemoto | G06K 9/32 |
| 2001/0043738 | A1 | 11/2001 | Sawhney et al. | |
| 2004/0105573 | A1 | 6/2004 | Neumann et al. | |

(Continued)

OTHER PUBLICATIONS

Neubert et al., "Rapidly constructed appearance models for tracking in augmented reality applications", Machine Vision and Applications 2012.*

(Continued)

*Primary Examiner* — Soo Jin Park
(74) *Attorney, Agent, or Firm* — Silicon Valley Patent Group LLP

(57) ABSTRACT

Disclosed embodiments pertain to apparatus, systems, and methods for robust feature based tracking. In some embodiments, a score may be computed for a camera captured current image comprising a target object. The score may be based on one or more metrics determined from a comparison of features in the current image and a prior image captured by the camera. The comparison may be based on an estimated camera pose for the current image. In some embodiments, one of a point based, an edge based, or a combined point and edge based feature correspondence method may be selected based on a comparison of the score with a point threshold and/or a line threshold, the point and line thresholds being obtained from a model of the target. The camera pose may be refined by establishing feature correspondences using the selected method between the current image and a model image.

30 Claims, 6 Drawing Sheets

(56) References Cited

U.S. PATENT DOCUMENTS

2006/0188131 A1    8/2006    Zhang et al.
2010/0232727 A1    9/2010    Engedal et al.
2012/0086727 A1    4/2012    Korah et al.
2012/0092329 A1    4/2012    Koo et al.
2012/0201469 A1    8/2012    Livet et al.

OTHER PUBLICATIONS

Lee et al., "Handy AR: markerless inspection of augmented reality objects using fingertip tracking", 2007 11th IEEE International Symposium on Wearable Computers.*

Choi et al., "Real-time 3D model-based tracking using edge and keypoint features for robotic manipulation", 2011 IEEE Conference on Robotics and Automation.*

Wagner et al., "Pose tracking from natural features on mobile phones", 2008 IEEE International Symposium on Mixed and Augmented Reality.*

Alvarez H., et al., "Providing guidance for maintenance operations using automatic markerless augmented reality system", Mixed and Augmented Reality (ISMAR), 2011 10th IEEE International Symposium On, IEEE, Oct. 26, 2011, pp. 181-190, XP032028057, DOI: 10.11 09/ISMAR.2011.6092385 ISBN: 978-1-4577-2183-0.

International Search Report and Written Opinion—PCT/US2014/038461—ISA/EPO—Sep. 3, 2014.

Oh J., et al., "Efficient mobile museum guidance system using augmented reality", Consumer Electronics, 2008, ISCE 2008, IEEE International Symposium On, IEEE, Piscataway, NJ, USA, Apr. 14, 2008, pp. 1-4, XP031283628, ISBN: 978-1-4244-2422-1.

Pei S.C., et al., "Vehicle-type motion estimation by the fusion of image point and line features", Pattern Recognition, Elsevier, GB, vol. 31 , No. 3, Mar. 1, 1998, pp. 333-344, XP0041 01853, ISSN: 0031-3203, DOI: 10.1016/S0031-3203(97)00141-6.

* cited by examiner

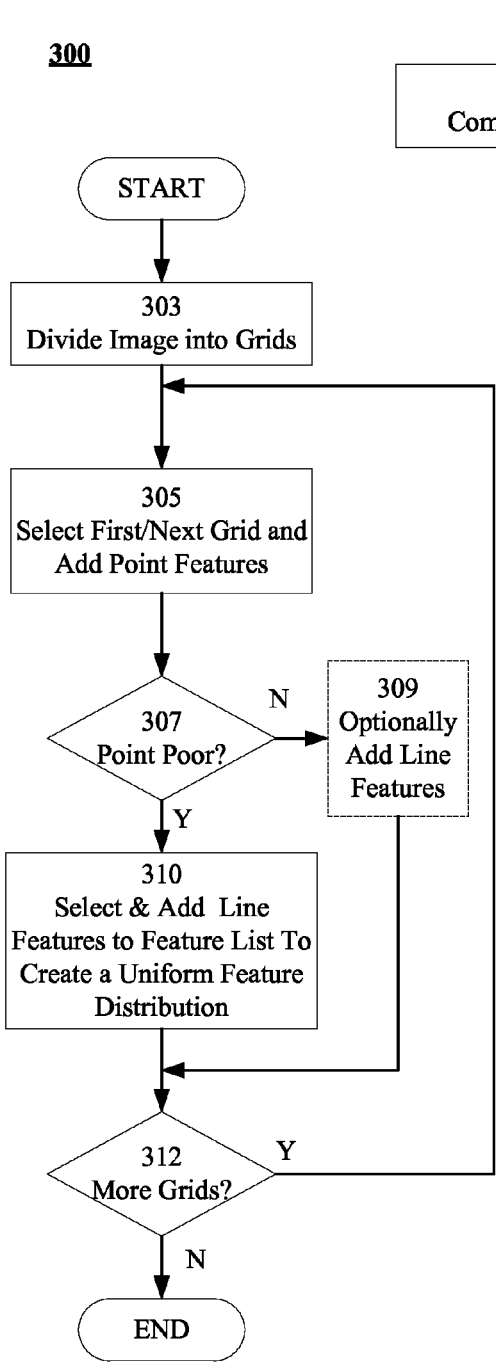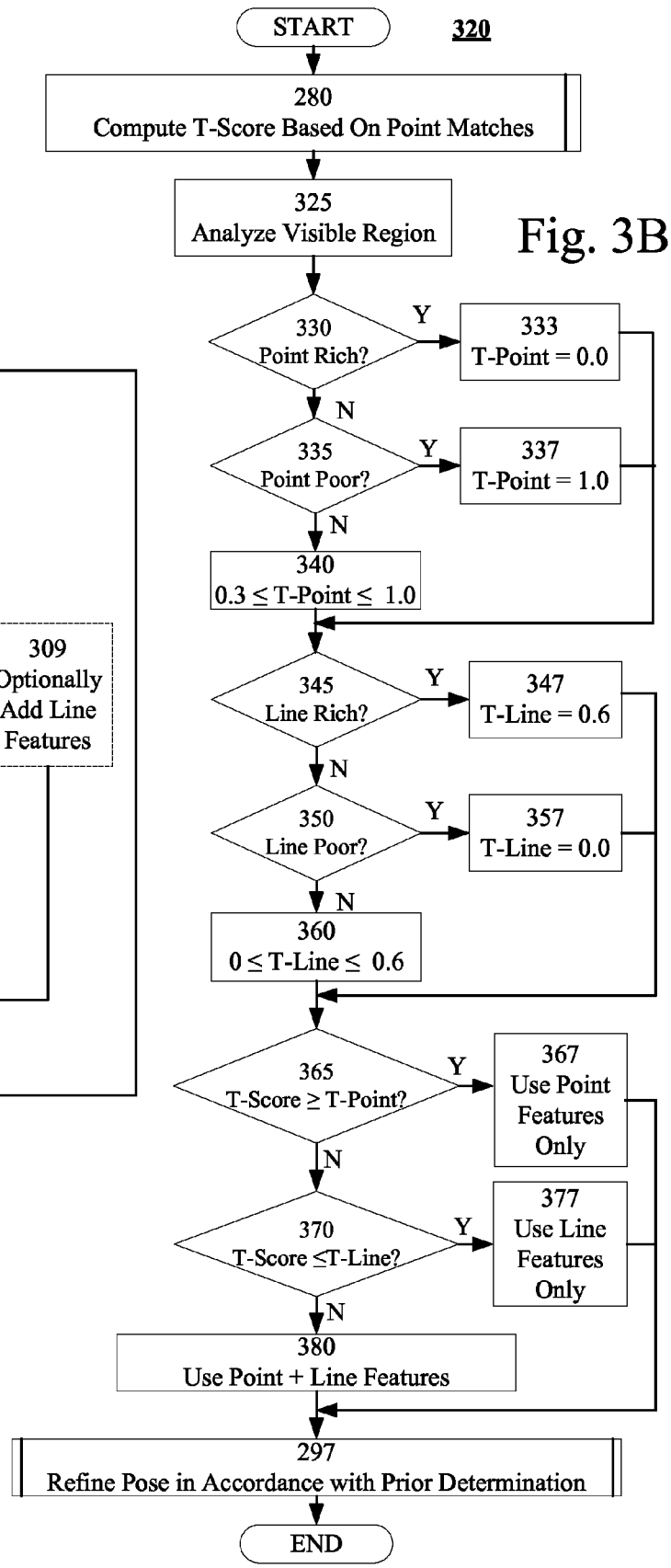
Fig. 3A
Fig. 3B

ROBUST TRACKING USING POINT AND LINE FEATURES

CROSS REFERENCE TO RELATED APPLICATIONS

This application claims the benefit of and priority to U.S. Provisional Application No. 61/835,402 entitled "Robust Tracking Using Point and Line Features," filed Jun. 14, 2013, which is incorporated by reference in its entirety herein.

FIELD

This disclosure relates generally to apparatus, systems, and methods for robust feature based tracking, and in particular, to systems and methods for robust feature-based tracking using a combination of point and line features.

BACKGROUND

With recent advances in technology Augmented Reality (AR) applications are increasingly common on everyday user devices such as smartphones. In AR applications, which may be real-time interactive, real images may be processed to add virtual object(s) to the image and to align the virtual object to a captured image in 3 Dimensions (3D). Typically, the virtual objects supplement real world images. Therefore, detecting and localizing objects present in a real image and determining the pose of the camera relative to the objects through image sequences facilitates accurate virtual object placement and preserves the blending of the real and virtual worlds.

When hand-held user devices are used for image capture, robust tracking methods are desirable to tolerate rapid unconstrained hand movements, which can result in tracking failure and/or poor pose estimation. While point based features are easily localized and facilitate the determination of feature correspondences between images, they are susceptible to tracking errors, which can lead to pose drift. On the other hand, line or edge based features are less susceptible to pose drift because they are stable in the face of lighting and aspect changes. However, they are susceptible to errors during feature correspondence determination, which makes robust edge-tracking challenging.

Therefore, there is a need for robust tracking methods that enhance current feature-based tracking approaches to achieve robustness and tracking accuracy for a more optimal AR experience.

SUMMARY

Disclosed embodiments pertain to systems, methods and apparatus for effecting robust feature-based tracking using point and edge features.

In some embodiments, the method may comprise: computing a score for a current camera captured image comprising a target object, wherein the score is based, at least in part, on one or more metrics determined from a comparison of features in the current image and a prior image captured by the camera, and wherein the comparison is based on an estimated camera pose for the current image. Further, one of a point based, an edge based, or a combined point and edge based feature correspondence method may be selected based, at least in part, on a comparison of the score with at least one point threshold and at least one line threshold, the at least one point threshold and the at least one line threshold obtained from a model of the target.

In another aspect, a User device (UD) may comprise: a camera configured to capture a plurality of images comprising a target object, a memory configured to store a model of the target object, and a processor coupled to the camera and the memory. In some embodiments, the processor may be configured to: compute a score for a current image captured by the camera, where the score is based, at least in part, on one or more metrics determined from a comparison of features in the current image and a prior image captured by the camera, and wherein the comparison is based on an estimated camera pose for the current image. The processor may further be configured to select one of a point based, an edge based, or a combined point and edge based feature correspondence method based, at least in part, on a comparison of the score with at least one point threshold and at least one line threshold, the at least one point threshold and the at least one line threshold obtained from the model of the target object.

In a further aspect, an apparatus may comprise: imaging means for capturing a plurality of images comprising a target object, storage means for storing a model of the target object, the storage means coupled to the imaging means; means for computing a score for a current image captured by the imaging means, the score based, at least in part, on one or more metrics determined from a comparison of features in the current image and a prior image captured by the imaging means, and wherein the comparison is based on an estimated imaging means pose for the current image; and means for selecting one of a point based, an edge based, or a combined point and edge based feature correspondence method based, at least in part, on a comparison of the score with at least one point threshold and at least one line threshold, the at least one point threshold and the at least one line threshold obtained from the stored model of the target.

Disclosed embodiments also pertain to a non-transitory computer-readable medium comprising instructions, which when executed by a processor perform steps in a method, where the steps may comprise: computing a score for a current camera captured image comprising a target object, where the score is based, at least in part, on one or more metrics determined from a comparison of features in the current image and a prior image captured by the camera, and wherein the comparison is based on an estimated camera pose for the current image. Further, one of a point based, an edge based, or a combined point and edge based feature correspondence method may be selected based, at least in part, on a comparison of the score with at least one point threshold and at least one line threshold, the at least one point threshold and the at least one line threshold obtained from a model of the environment.

BRIEF DESCRIPTION OF THE DRAWINGS

Embodiments of the invention will be described, by way of example only, with reference to the drawings.

FIG. 3A shows a flowchart for an exemplary method for analyzing an image in a manner consistent with disclosed embodiments.

FIG. 3B shows a flowchart for an exemplary method for feature tracking based on a combination of point and line features in a manner consistent with disclosed embodiments.

DETAILED DESCRIPTION

Figure 1:
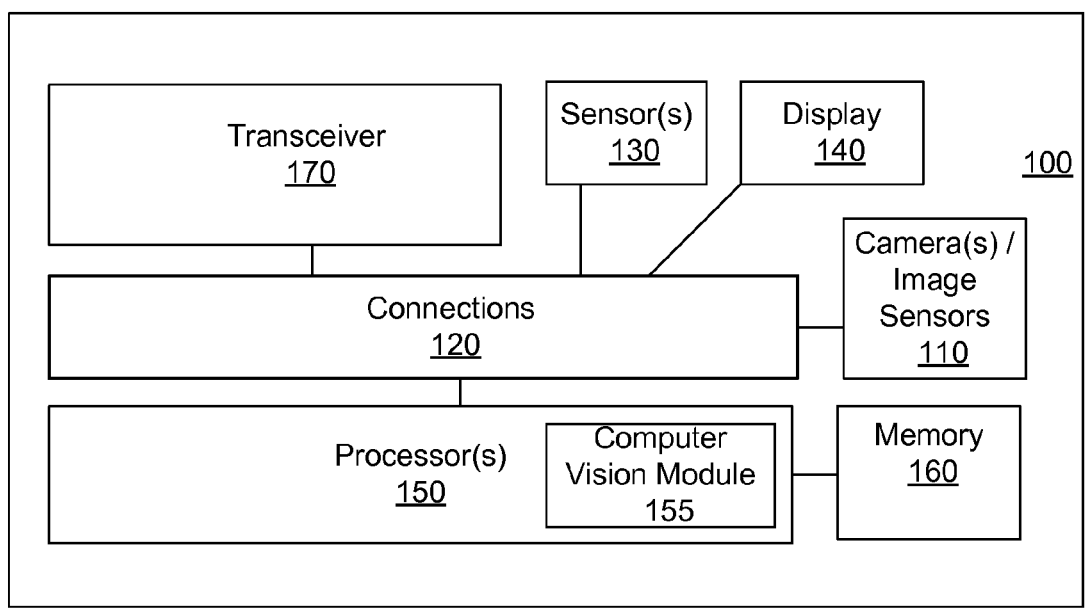
FIG. 1 shows a block diagram of an exemplary user device capable of implementing feature based tracking in a manner consistent with disclosed embodiments.

In computer vision, detection refers to the process of localizing a target object in a captured image frame and computing a camera pose with respect to the object. Tracking refers to camera pose estimation relative to the object over a temporal sequence of image frames. In feature tracking, features may be detected once and then tracked directly in subsequent images using prior information or assumptions about the camera pose. For an initial determination of camera pose (initialization), feature matching may be used. In feature matching, correspondences between two images may be established without prior information about the camera pose by detecting features in both images, which may then be matched against each other. For example, during initialization, an initial captured image may be compared with one or more stored model reference images, where each reference image is associated with a known pose and set of distinctive features with known coordinates, to find a closest matching image. The camera pose associated the closest matching image may be used as an initial estimate of camera pose for the initial image.

Typically, in feature-based tracking methods, features may be used to represent objects. Therefore, conventional feature-based object tracking may include the steps of feature extraction and feature correspondence. Feature extraction refers to the detection of features in an image, while feature correspondence is the process of matching or determining a correspondence between features in two images. Therefore, the use of salient features that are likely to be salient over multiple views under different imaging conditions (e.g. scale, illumination, orientation, etc) facilitates feature correspondence determination. Ambiguity in feature correspondence can lead to tracking errors. In conventional systems, feature correspondence between images is typically established using either point-based features (tracking points) or line or edge based features (edge tracking). The terms "line" and "edge" are used interchangeably in descriptions of feature tracking herein.

Point based feature tracking facilitates easy determination of feature correspondences between images and is relatively robust to unexpected inter-frame motion. However, computational efficiency in point based techniques is often realized by decreasing the size of the windows over which correspondence is determined. The decrease in window size for correspondence determination leads to tracking errors over image sequences contributing to pose drift. The detection of salient edges is robust in the face of varying illumination. Relying only on edge information provides good results when tracking sharp edges even if there are illumination and aspect changes. However, edge based tracking is susceptible to correspondence mismatches. For example, in images where many edges are clustered together correspondence mismatches may occur, thereby affecting robustness.

Conventional attempts to combine point and edge based tracking typically alternate between point and edge tracking based on some conditions. In other words, at any time either point or edge based tracking is used to establish feature correspondence. These methods only alternate between the two schemes, thus, a bad pose estimate in one approach may influence the estimate in the other.

Therefore, some embodiments disclosed herein apply computer vision and other image processing techniques to enhance tracking capabilities by combining point and edge based tracking techniques.

These and other embodiments are further explained below with respect to the following figures. It is understood that other aspects will become readily apparent to those skilled in the art from the following detailed description, wherein it is shown and described various aspects by way of illustration. The drawings and detailed description are to be regarded as illustrative in nature and not as restrictive.

FIG. 1 shows a block diagram of an exemplary User device (UD) 100 capable of implementing feature based tracking in a manner consistent with disclosed embodiments. As used herein, UD 100, may take the form of a mobile station or mobile device such as a cellular phone, mobile phone, or other wireless communication device, a personal communication system (PCS) device, personal navigation device (PND), Personal Information Manager (PIM), or a Personal Digital Assistant (PDA), a laptop, tablet, notebook and/or handheld computer or other mobile device. In some embodiments, UD 100 may take the form of a wearable computing device, which may include a display device and/or a camera paired to a wearable headset. For example, the headset may include a head mounted display (HMD), which may be used to display live and/or real world images. In some embodiments, the live images may be overlaid with one or more virtual objects. In some embodiments, UD 100 may be capable of receiving wireless communication and/or navigation signals.

Further, the term "user device" is also intended to include devices which communicate with a personal navigation device (PND), such as by short-range wireless, infrared, wireline connection, or other connections and/or position-related processing occurs at the device or at the PND. Also, "user device" is intended to include all devices, including various wireless communication devices, which are capable of communication with another computing device such as a server, regardless of whether wireless signal reception, assistance data reception, and/or related processing occurs at the device, at a server, or at another device associated with the network. Any operable combination of the above are also considered a "user device."

The term user device is also intended to include gaming or other devices that may not be configured to connect to a network or to otherwise communicate, either wirelessly or over a wired connection, with another device. For example, a user device may omit communication elements and/or networking functionality. For example, embodiments described herein may be implemented in a standalone device that is not configured to connect for wired or wireless networking with another device.

In some embodiments, UD 100 may be capable of implementing various Computer Vision (CV) methods including image analysis, feature detection/tracking, feature correspondence determination, modeling, 3D reconstruction, AR, etc. In some instances, the CV methods may be based on an existing model of a 3D environment. Further, in some embodiments, the CV methods may be implemented in real time or near real time in a manner consistent with disclosed embodiments.

As shown in FIG. 1, UD 100 may include one or more cameras or image sensors 110 (hereinafter referred to as "camera(s) 110"), sensor bank or sensors 130, display 140, one or more processor(s) 150 (hereinafter referred to as "processor(s) 150"), memory 160 and/or transceiver 170, which may be operatively coupled to each other and to other functional units (not shown) on UD 100 through connections 120. Connections 120 may comprise buses, lines, fibers, links, etc., or some combination thereof.

Transceiver 170 may, for example, include a transmitter enabled to transmit one or more signals over one or more types of wireless communication networks and a receiver to receive one or more signals transmitted over the one or more types of wireless communication networks. Transceiver 170 may permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, etc, and/or Wireless Wide Area Networks (WWANs) such as LTE, WiMAX, etc.

For example, the transceiver 170 may facilitate communication with a WWAN such as a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from an organization known as the "3rd Generation Partnership Project" (3GPP). Cdma2000 is described in documents from a consortium named "3rd Generation Partnership Project 2" (3GPP2). 3GPP and 3GPP2 documents are publicly available. The techniques may also be implemented in conjunction with any combination of WWAN, WLAN and/or WPAN. User device may also include one or more ports for communicating over wired networks. In some embodiments, the transceiver 170 and/or one or more other ports on user device 100 may be omitted. Embodiments disclosed herein may be used in a standalone CV/AR system/device, for example, in a mobile station that does not require communication with another device.

In some embodiments, camera(s) 110 may include multiple cameras, front and/or rear-facing cameras, wide-angle cameras, and may also incorporate charge coupled devices (CCD), complementary metal oxide semiconductor (CMOS), and/or various other image sensors. Camera(s) 110, which may be still or video cameras, may capture a series of image frames of an environment and send the captured image frames to processor 150. The images captured by camera(s) 110 may be color (e.g. in Red-Green-Blue (RGB)) or grayscale. In one embodiment, images captured by camera(s) 110 may be in a raw uncompressed format and may be compressed prior to being processed by processor(s) 150 and/or stored in memory 160. In some embodiments, image compression may be performed by processor(s) 150 using lossless or lossy compression techniques.

Processor(s) 150 may execute software to process image frames captured by camera 110. For example, processor(s) 150 may be capable of processing one or more image frames captured by camera(s) 110 to perform image analysis, feature extraction, feature tracking/detection, feature correspondence, determine the pose of a camera 110 and/or to perform 3D reconstruction of an environment corresponding to an image captured by camera(s) 110.

The pose of camera 110 refers to the position and orientation of the camera 110 relative to a frame of reference. In some embodiments, camera pose may be determined for 6-Degrees Of Freedom (6DOF), which refers to three translation components (which may be given by X,Y,Z coordinates) and three angular components (e.g. roll, pitch and yaw). In some embodiments, the pose of camera 110 and/or UD 100 may be determined and/or tracked by processor(s) 150 using a visual tracking solution based on image frames captured by camera 110.

Processor(s) 150 may be implemented using a combination of hardware, firmware, and software. Processor(s) 150 may represent one or more circuits configurable to perform at least a portion of a computing procedure or process related to CV including image analysis, 3D reconstruction, tracking, feature extraction from images, feature correspondence between images, modeling, image processing etc and may retrieve instructions and/or data from memory 160. In some embodiments, processor(s) 150 may comprise CV module 155, which may execute or facilitate the execution of various CV applications, such as the exemplary CV applications outlined above.

Memory 160 may be implemented within processors 150 and/or external to processors 150. Processor(s) 150 may be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

Memory 160 may be implemented within processor(s) 150 and/or external to processors 150. As used herein the term "memory" refers to any type of long term, short term, volatile, nonvolatile, or other memory and is not to be limited to any particular type of memory or number of memories, or type of physical media upon which memory is stored. In some embodiments, memory 160 may hold code to facilitate various CV and/or image processing methods including image analysis, tracking, feature detection/extraction, feature correspondence determination, modeling, 3D reconstruction, AR applications and other tasks performed by processor 150. For example, memory 160 may hold data, captured still images, 3D models, depth information, video frames, program results, as well as data provided by various sensors. In general, memory 160 may represent any data storage mechanism. Memory 160 may include, for example, a primary memory and/or a secondary memory. Primary memory may include, for example, a random access memory, read only memory, etc. While illustrated in FIG. 1 as being separate from processors 150, it should be understood that all or part of a primary memory may be provided within or otherwise co-located and/or coupled to processors 150.

Secondary memory may include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory may be operatively receptive of, or otherwise configurable to couple to a non-transitory computer-readable medium in a removable media drive (not shown) coupled to UD 100. In some embodiments, non-transitory computer readable medium may form part of memory 160 and/or processor 150.

In some embodiments, UD 100 may comprise a variety of other sensors 130 such as one or more of stereo cameras, ambient light sensors, microphones, acoustic sensors, ultrasonic sensors, laser range finders, etc. In certain example implementations, user device 100 may include an Inertial Measurement Unit (IMU), which may comprise 3-axis gyroscope(s), 3-axis accelerometer(s), and/or magnetometer(s). The IMU may provide velocity, orientation, and/or other position related information to processor 150. In some embodiments, IMU may output measured information in synchronization with the capture of each image frame by cameras 130. In some embodiments, the output of IMU may be used in part by processor(s) 150 to determine, correct, and/or otherwise adjust the estimated pose a pose of camera 110 and/or UD 100. Further, in some embodiments, images captured by camera(s) 110 may also be used to recalibrate or perform bias adjustments for the IMU.

Further, UD 100 may include a screen or display 140 capable of rendering color images, including 3D images. In some embodiments, UD 100 may comprise ports to permit the display of the 3D reconstructed images through a separate monitor or display coupled to UD 100. In some embodiments, the display and/or UD 100 may take the form of a wearable device. In some embodiments, display 140 may be used to display live images captured by camera 110, Augmented Reality (AR) images, Graphical User Interfaces (GUIs), program output, etc. In some embodiments, display 140 may comprise and/or be housed with a touchscreen to permit users to input data via some combination of virtual keyboards, icons, menus, or other GUIs, user gestures and/or input devices such as a stylus and other input devices. In some embodiments, display 140 may be implemented using a Liquid Crystal Display (LCD) display or a Light Emitting Diode (LED) display, such as an Organic LED (OLED) display. In other embodiments, display 140 may be a wearable display, which may be operationally coupled to, but housed separately from, other functional units in UD 100. In some embodiments, UD 100 may comprise ports to permit the display of images through a separate monitor coupled to MS 100.

Not all modules comprised in UD 100 have been shown in FIG. 1. Exemplary user device 100 may also be modified in various ways in a manner consistent with the disclosure, such as, by adding, combining, or omitting one or more of the functional blocks shown. For example, in some configurations, user device 100 may not include Transceiver 170. In some embodiments, UD 100 may additionally comprise a Satellite Positioning System (SPS) unit, which may be used to provide location information to UD 100. In some embodiments, portions of user device 100 may take the form of one or more chipsets, and/or the like.

In some embodiments, UD 100 may be capable of executing various AR applications, which may use visual feature based tracking. In some embodiments, UD 100 may execute a tracking method based on a combination of edge and feature tracking in a manner consistent with embodiments disclosed herein.

Figures 2A, 2B:
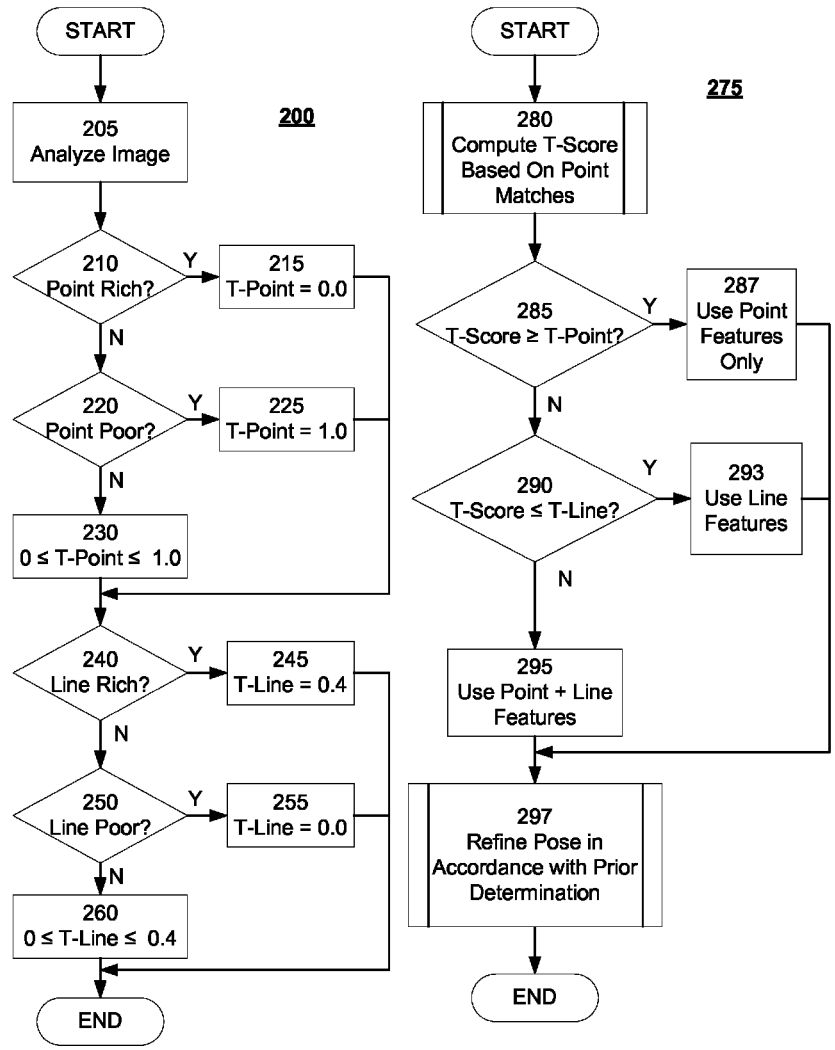
FIG. 2A shows a flowchart for an exemplary method for analyzing an image in a manner consistent with disclosed embodiments.
FIG. 2B shows a flowchart for an exemplary method for feature tracking based on a combination of point and line features in a manner consistent with disclosed embodiments.

FIG. 2A shows a flowchart for an exemplary method 200 for analyzing an image in a manner consistent with disclosed embodiments. In exemplary method 200, specific values for thresholds have been used to illustrate the method and for explanatory purposes. However, these threshold values are not limited to the exemplary values used and may be varied appropriately.

In some embodiments, method 200 may be performed as an offline process during a model creation stage. For example, a 3D model of a target to be tracked may be created using a combination of point and edge-based features. In some embodiments, the model may include a database of points and lines from a target being tracked. For example, in one embodiment, the 3D model may include both point clouds and edges in 3D space. Further, the 3D model may include databases of 3D point locations and descriptors, and a computer-aided design (CAD) model of salient edges. In some embodiments, the model creation may be performed in real-time based on live images captured by camera 110. In some embodiments, method 200 may be performed by processor(s) 150 and/or CV module 155 during model creation or analysis. In step 205, one or more images pertaining to the model may be analyzed to extract features from the image(s). The extracted features may comprise point and/or line/edge features. In general, one or more point detection techniques such as Scale Invariant Feature Transform (SIFT), Speeded Up Robust Features (SURF), etc may be used in combination with edge detection techniques such as Canny edge detection and its variants thereof, differential edge detection techniques, Sobel edge detection, etc. in a manner consistent with disclosed embodiments. Detection techniques include corner detectors such as "Feature from Accelerated Segment Test" (FAST), "Smallest Univalue Segment Assimilating Nucleus" (SUSAN), Maximally Stable Extremal Region (MSER) based detectors, Harris detectors, etc. For example, in instances where corner detectors are used, corner points detected by the corner detector may be used as point features. In general, any appropriate point and/or edge detection technique may be used based on available system resources, accuracy desired, speed, and other design parameters.

Next, in step 210, if the image(s) are rich in point features i.e. "point rich" ("Y" in step 210), then in step 215, threshold value T-Point may be set to "0.0", and the method proceeds to step 240. Otherwise ("N" in step 210), the method proceeds to step 220.

In step, 220, if the image(s) lacks point features i.e. "point poor" ("Y" in step 220), then in step 225, threshold value T-Point may be set to "1.0" and the method proceeds to step 240. Otherwise ("N" in step 220), the method proceeds to step 230, where the value of threshold T-Point may be set to a number between 0.0 and 1.0 based on the number of point features detected in the image.

In some embodiments, a determination of whether an image is point rich or point poor may be made based on the number of point features extracted from the image. For example, if the number of extracted point features exceeds a first point count value, then the image may be deemed point rich. Conversely, if the number of extracted point features is below a second point count value, then the image may be deemed point poor. Some images, whose point count fall between the first and second point counts may be neither point rich nor point poor. The point count value may be set heuristically, based on the processing power available, response times desired, degree of tracking accuracy desired, and/or other system parameters.

Next, in step 240, if the image(s) are rich in line features i.e. "line rich" ("Y" in step 240), then in step 245, threshold value T-Line may be set to "0.4" and the method may terminate. Otherwise ("N" in step 240), the method proceeds to step 250. The values of T-Point and T-line above are exemplary. In general, the values of T-Point and T-line may be selected based on the weights accorded to point or line features. In the example above, where T-Line=0.4, point features have been accorded greater weight than line features.

In step, 250, if the image(s) lacks line features i.e. "line poor" ("Y" in step 250), then in step 255, threshold value T-Line may be set to "0.0" and the method may terminate. Otherwise ("N" in step 250), the method proceeds to step 260, where the value of threshold T-Line may be set to a number between 0.0 and 0.4 based on the number of line features detected in the image prior to terminating.

In some embodiments, a determination of whether an image is line rich or line poor may be made based on the number of line features extracted from the image and/or portions of the image. For example, if the number of extracted line features exceeds some line count value, then the image may be deemed line rich. Conversely, if the number of extracted line features is below some line count value, then the image may be deemed line poor. The line count value may be set heuristically, based on the environment, processing power available, response times desired, degree of tracking accuracy desired, and/or other system parameters.

The values of thresholds T-Point and T-Line indicated above are exemplary and for illustrative purposes only. In general, the values selected for T-Point and T-Line may be varied depending on various system parameters and/or based on the modeled environment and/or varied to indicate a preference for point and/or line features. In some embodiments, T-Point and T-Line may take values such that 0≤T-Point, T-Line≤1. The values of T-Point and T-line used in method 200 may serve as indicators of the availability and/or the desirability of using point, line, or point and line features in 3D model for tracking purposes.

The values of T-Line and T-Point determined in method 200, for example during a model creation phase, may be compared with a score determined during a feature tracking phase. For example, the score in the feature tracking phase may be based on the number of feature points in a tracked target in a live image that match feature points in the model created during the model creation phase. In some embodiments, based on a comparison of the score with the values of T-Point and/or T-Line, one of point-based, line-based, or point and line based features may be used for target tracking. In general, arbitrary values may be used for T-Point and T-line in method 200, followed by selection of an appropriate value for the score consistent with preferences for point, line or point and line based feature tracking. The values selected may be used to determine when point-based, line-based, or point and line based feature tracking is invoked during the feature tracking phase.

In some embodiments, method 200 may be performed by a server or another computing device for a given environment and the model and associated results such as threshold values T-Point and T-Line may be sent to and/or obtained by UD 100 and stored in memory 160 for later use with a CV application for that environment.

In some embodiments, the 3D model may comprise multiple images or keyframes at a variety of camera poses and T-Point and T-Line values may be determined for some subset of the keyframes. In some embodiments, each keyframe may be associated with corresponding T-Point and/or T-Line values, which may be based on the distribution of features specific to the keyframe. In some embodiments, one or more keyframes for a model may be processed to obtain T-Point and/or T-Line values corresponding to each processed keyframe. In embodiments where a model is being created in real time and/or from live images, the processing and determination of corresponding T-Point and/or T-Line values may occur at the time an image is designated as a keyframe. Further, in some embodiments, where T-Point and/or T-Line values correspond to specific keyframes, method 200 may be performed for each keyframe and the corresponding T-Point and/or T-Line values, and any related feature descriptors may be associated with the keyframe and stored as part of the model.

FIG. 2B shows a flowchart for an exemplary method 275 for feature tracking based on a combination of point and line features in a manner consistent with disclosed embodiments. Methods 200 and 275 are merely exemplary and various modifications may be made to the methods. For example, in some embodiments, method 275 may be performed as an online process, or in real-time when a target is being tracked by AR application. In some embodiments, method 275 may be performed by processor(s) 150 during target tracking based on live images being captured by camera 110. In some embodiments, method 275 may invoke method 200 in real time to determine and add T-Point and/or T-line values to a preexisting model with extracted point and line features (but without T-Point and/or T-Line values). In some embodiments, as noted above, where a keyframe based model is being created in real time and/or from live images, the processing and determination of corresponding T-Point and/or T-Line values (e.g. by invoking method 200) may also occur at the time an image is designated as a keyframe.

In step 280, an image captured by camera 110 may be processed to extract point features from the image. A T-Score may be assigned to the captured image based on the number of point matches during a feature tracking step. For example, the current image frame may be compared with a prior image such as an immediately preceding image frame and/or an average Normalized Cross Correlation (NCC) score for point matches. In some embodiments, the score may comprise a weighted sum of one or more of the above parameters. For example, T-Score may be computed as a value between 0 and 1 (e.g. 0≤T-Score≤1).

NCC is a correlation based method that permits the matching on image pairs even in situations with large relative camera motion. "Bad" feature point matches refer to the number of unsuccessful NCC matching attempts i.e. the number of failed point matches and/or or matches with a low correlation scores. For example, the current image frame may be compared with a prior image such as an immediately preceding image frame. The T-Score value may be based on one or more of: the number of good feature point matches and/or the number of bad feature point matches. Because NCC fails to localize a point that is likely in view, bad feature point matches may be seen as a metric pertaining to the quality of the current image frame. For example, feature point matches may be designated as "good" if they have high NCC values (e.g. 100 or more) and lower tracking error (e.g. not exceeding a 2 pixel re-projection error). Note that the NCC values and tracking errors outlined above are merely exemplary and may be modified based on system parameters such as desired performance, tracking accuracy etc. Feature matches that are below the NCC value above (e.g. below 100) or exceed the tracking error above (e.g. more than 2 pixels) may be designated as "bad".

In some embodiments, the T-Score value may be based on one or more of: a proportion of correct matches relative to maximum or expected number of feature point matches. For example, the expected number of feature points matches may be determined by experimentally observing tracking quality and tracking time. In some embodiments, the proportion of correct matches relative to maximum or expected number of feature point matches may be preconfigured to a default value and/or user-configured. In one embodiment, the system be configured for a desired performance and may heuristically adjust the maximum or expected number of tracked features to attain the desired performance. Conversely, the system be configured for a desired tracking quality and may heuristically adjust the maximum or expected number of tracked features to attain the desired tracking accuracy.

In some embodiments, the scoring may be performed at all levels of the image pyramid. For example, images captured by camera 110 may be downsampled and filtered to create a pyramid of images, where the highest resolution (or raw) image may be at the top of the image pyramid and the lowest resolution image may be at the bottom of the pyramid. For example, the highest level (level 0) of the pyramid may have the raw or highest resolution image and each level below may downsample the image relative to the level immediately above by some factor. For example, for an image $I_0$ of size 640×480 (at level 0), the images $I_1$, $I_2$, $I_3$ and $I_4$ are of sizes 320×240, 160×120, 80×60 and 40×30, respectively, where the subscript indicates the image level in the image pyramid.

The values of T-Line and/or T-Point determined in method 200, for example during the model creation phase, may be compared with T-Score determined in step 280. As discussed above, the value of T-score determined in step 280 may be based on various metrics obtained from a comparison of a live image with a preceding image. In the exemplary method 275 shown in FIG. 2B, for example, T-Score is determined based on the number of point matches. In embodiments, where a keyframe based model is being used and keyframes have corresponding T-Point and/or T-Line values, the current camera pose may be used to determine a keyframe closest to the current camera pose based on Euclidean distance and the corresponding values of T-Line and/or T-Point (for the closest keyframe) may be compared with T-Score for the current image.

In some embodiments, based on a comparison of T-Score with the values of T-Point and/or T-Line, one of point-based, line-based, or point and line based feature tracking may be invoked. In general, T-Score may be computed using any scoring scheme that is compatible with a method used to obtain T-Point and T-line. For example, if T-Point and T-Line take values such that $0 \leq$ T-Point, T-Line$\leq 1$, then T-Score may be computed or normalized to obtain a T-Score value between 0 and 1 ($0 \leq$ T-Score $\leq 1$). Because T-Score is computed based on metrics related to feature comparisons for an image pair, T-Score may be viewed as an indicator of suitability of the current image frame for a particular method of feature tracking. Thus, if (as in step 280), for example, T-Score is determined based on the number of point matches, then, a low T-Score would suggest that the current frame is not well suited for point based feature tracking.

Next, in step 285, the value of T-Score that was computed in the previous step may be compared with T-Point. If T-Score$\geq$T-Point ("Y" in step 285), then, in step 287 a determination to use only point features for a subsequent pose refinement step may be made and method 275 may invoke routine 297.

In FIG. 2A, in exemplary method 200, T-Point=0.0 for a point rich image, while T-Line=0.4 (>0.0) for a line rich image. The weights assigned in exemplary method 200 are used in conjunction with exemplary method 275 to favor points over lines. Accordingly, in exemplary method 275, in step 280, T-Score is computed based on point matches, and in step 285, if T-Score$\geq$T-Point, then, in step 287, point based feature tracking is selected as the feature tracking method. Because T-Point=0.0 when an image is point rich, in exemplary method 275, the condition (T-Score$\geq$T-Point) in step 285 is always satisfied for point rich images, and point based feature tracking is selected when an image is point rich.

If T-Score<T-Point ("N" in step 285), then, in step 290 the value of T-Score (from step 280) may be compared with T-Line. If T-Score$\leq$T-Line ("Y" in step 290), then, in step 293, a determination to use edge features for a subsequent pose refinement step may be made and method 275 may invoke 297.

Otherwise ("N" in step 290), in step 295, T-Line<T-Score<T-Point and a determination to use point and edges for the subsequent pose refinement step may be made and method 275 may invoke routine 297.

Again, referring to FIG. 2A, for line rich images T-Line=0.4 (>0.0), thus, in some instances even when the condition in step 285 (T-Score$\geq$T-Point) is not satisfied and point-based feature tracking is not selected, T-Score may not be less than T-Line=0.4 in step 290, so a point and line based feature tracking method may be selected in step 295. In exemplary method 275, for a line based feature tracking method to be selected, even for a line rich image, the condition in step 285 (T-Score$\geq$T-Point) should not be satisfied (the image should not be point rich—otherwise point based feature tracking is favored), and T-Score should be lower than T-Line 0.4 in step 290. A low T-Score indicates a poor score for point based feature tracking. Thus, in exemplary methods 200 and 275, point based features and point based feature tracking is favored over line based features and line based feature tracking. However, methods 200 and 275 are merely exemplary, and a different weighting scheme could be used to give line and point features equal weights, or alternatively, to weight line features over point features. Step 280 and decision boxes 285 and 290 may be adjusted to reflect the weighting scheme selected.

In routine 297, the pose estimate may be refined based on the prior determination as made in one of steps 287, 293, or 295. For example, in one embodiment, a prior or estimated 6DOF camera pose may be refined using the 2D-3D feature correspondences based on the determination as made in one of steps 287, 293, or 295.

FIG. 3A shows a flowchart for an exemplary method 300 for analyzing an image during a model creation stage in a manner consistent with disclosed embodiments. In some embodiments, method 300 may be performed as an offline process during a model creation stage. In some embodiments, method 300 may be performed by processor(s) 150 during model creation based on one or more images captured by camera 110. In some embodiments, method 300 may be repeated for some subset of keyframes in a model. Methods 300 and 320 (FIG. 3B) are merely exemplary and various modifications may be made to the methods. For example, exemplary methods 300 and 320 favor selection and use of point features over line features. However, the methods may be easily altered to vary the preferences.

In some embodiments, a model may comprise keyframes and each keyframe may be associated with corresponding T-Point and/or T-Line values, which may be based on the distribution of features specific to the keyframe. In some embodiments, one or more keyframes for a model may be processed to obtain T Point and/or T Line values corresponding to each processed keyframe. In embodiments where a model is being created in real time and/or from live images, the processing and determination of corresponding T-Point and/or T-Line values may occur at the time an image is designated as a keyframe. Further, in some embodiments, where T-Point and/or T-Line values correspond to specific keyframes, method 300 may be performed for each keyframe and the corresponding T-Point and/or T-Line values, and any related feature descriptors may be associated with the keyframe and stored as part of the model.

In step 303, one or more images pertaining to the model may each be divided into subdivisions to extract point features from the image subdivisions. In some embodiments, the subdivisions may take the form of various polygons. In one embodiment, such as the exemplary embodiment described below, the images may be divided into a plurality of grids.

In step 305, the first or next grid may be selected and point features may be added to a feature list for the grid/model. In step 307, if the grid is Point Poor ("Y" in step 307), then, in step 310, line features maybe extracted for the grid and may be added to the feature list so as to create a uniform feature distribution across grids in an image. For example, in some embodiments, the number of line features added may depend on the degree to which point features are absent from the grid. In some embodiments, a table of the number of point and/or line features added to the model for each grid may be maintained.

In some embodiments, a determination of whether a grid is point rich or point poor may be made based on the number of point features extracted from the grid. For example, if the number of extracted point features from a grid exceeds a first point count value, then the grid may be deemed point rich. Conversely, if the number of extracted point features in a grid is below a second point count value, then the grid may be deemed point poor. Some grids, whose point count fall between the first and second point counts may be neither point rich nor point poor. The point count value for each grid may be set heuristically, based on the processing power available, response times desired, degree of tracking accuracy desired, and/or other system parameters.

In step 310, in some embodiments, feature distribution uniformity is facilitated, in part, by extracting a comparable number of point and/or line features from each grid. Thus, in some embodiments, the number of lines extracted may vary inversely relative to the number of points in the grid. Thus, as the number of points increases a lower number of lines may be extracted from a grid. Conversely, the number of lines extracted from a grid may be increased when the grid exhibits low point density. Feature uniformity across the image facilitates finding correspondences across the image, which contributes to pose refinement accuracy.

In embodiments, where image(s) in the model are divided into grids, a uniform distribution of point and line features throughout the target image may result in greater accuracy during tracking. The use of grids to distribute feature points/ edges offers advantages over a skewed feature distribution (such as when a majority of the point features are concentrated in a small region) because tracking instability may result when the feature distribution is non-uniform. In point poor regions, correspondence ambiguity is increased. Therefore, the addition of line features to point poor regions, in a manner consistent with disclosed embodiments can be beneficial and lead to increased tracking stability and better subsequent pose refinement.

In step 307, if the grid is Point Rich ("N" in step 307), then, in step 309, line features may be optionally added to the feature list for the grid/model, and the method progresses to step 312. In some embodiments, no line features may be added in step 309 for point rich grids and/or step 309 may be omitted. Thus, in exemplary method 300, in some instances, line based features may not be added when a grid is point rich ("N" in step 307) thus favoring point based feature tracking.

However, in some implementations, in step 309, for example, a varying number of line based features may be added to a grid based on the number of point features available in the grid. In some embodiments, in step 309, the optional number of line based features added may be subject to an upper limit. As another example, in step 309, a minimum number of line based features may be added to a grid without regard to the number of point based features.

As a further example, method 300 could be modified to favor line based features, step 307 could be modified to test whether a grid region is line rich and optionally add point features (e.g. in step 309) when the grid region is line poor. For example, line based features may be favored in instance where there is fast relative target movement and/or to facilitate tracking in the presence of motion blur. In general, method 300 may be modified to make the number of line based features a function of the number of point based features or, conversely, to make the number of point based features a function of the number of line based features.

In step 312, if there are additional grids to be processed ("Y" in step 312), then step 305 is invoked to begin the next iteration and another grid may be selected. If there are no further grids to be processed ("N" in step 312), then the method terminates.

FIG. 3B shows a flowchart for an exemplary method 320 for feature tracking based on a combination of point and line features in a manner consistent with disclosed embodiments. As outlined earlier, in exemplary method 320, point features are favored over line features—although to a lesser extent than in methods 200 and 275. In some embodiments, method 320 may be performed as an online process, or in real-time when a target is being tracked by AR application. In some embodiments, method 320 may be performed by processor(s) 150 during target tracking based on live images being captured by camera 110. In some embodiments, method 320 may invoke method 300 in real time to determine and add T-Point and/or T-line values to a preexisting model with extracted point and line features (but without T-Point and/or T Line values). In some embodiments, as noted above, where a keyframe based model is being created in real time and/or from live images, the processing and determination of corresponding T Point and/or T-Line values (e.g. by invoking method 300) may also occur at the time an image is designated as a keyframe.

In step 280, a current image captured by camera 110 may be processed to extract point features from the image. A T-Score may be dynamically assigned to the captured image based on the number of point matches during a feature tracking step. For example, an estimate of the camera pose for the current image may be determined based on a prior camera pose for a prior image, which in some instances, may be the immediately preceding image captured by camera 110. The current image may be compared with the prior image to obtain point matches. The dynamically computed T-Score value may be based on one or more of: the spatial distribution of the point matches, the number of good feature point matches/the number of bad feature point matches relative to a maximum or expected number of feature point matches, and/ or an average NCC score for point matches.

When feature point matches are used to determine T-Score, feature point matches designated as "good", for example, may have high NCC values (e.g. 100 or more) and lower tracking error (e.g. not exceeding a 2 pixel re-projection error). Note that the NCC values and tracking errors outlined above are merely exemplary and may be modified based on system parameters such as desired performance, tracking accuracy etc. Feature matches that are below the NCC value above (e.g. below 100) or exceed the tracking error above (e.g. more than 2 pixels) may be designated as "bad".

Further, the expected number of feature points matches may be determined by experimentally observing tracking quality and tracking time. In some embodiments, the proportion of correct matches relative to maximum or expected number of feature point matches may be preconfigured to a default value and/or user configured. In one embodiment, the system be configured for a desired performance and may heuristically adjust the maximum or expected number of tracked features to attain the desired performance. Conversely, the system be configured for a desired tracking quality and may heuristically adjust the maximum or expected number of tracked features to attain the desired tracking accuracy.

In some embodiments, the T-Score value may depend on the degree of uniformity associated with the spatial distribution of point matches. In one embodiment, a higher T-Score may be assigned when the spatial distribution of point matches is more uniform. In some embodiments, the score may comprise a weighted sum of one or more of the above parameters. For example, T-Score may be computed as a value between 0 and 1 (e.g. $0 \leq \text{T-Score} \leq 1$).

In step 325, the visible region of the model, which is the region in the previously created model that corresponds to the current image, may be analyzed. In some embodiments, the visible region of the model may be analyzed based on information in the previously created table indicating the number of point and line features (which were stored during model creation) for each grid in the modeled visible region. In some embodiments, the visible region of the model may be determined by using the stored model of the environment (such as a 3D-model) and the estimate of camera pose for the current image (which may be based on a prior pose) to project the model into the camera's view for the current image. In embodiments, where a keyframe based model is being used and keyframes have corresponding T-Point and/or T-Line values, the camera pose may be used to determine a keyframe closest to the current camera pose based on Euclidean distance. The keyframe closest to the current camera pose may then be projected into the camera's view, and corresponding values of T-Line and/or T Point (for the closest keyframe) in the visible region may be compared with T-Score for the current image. In some embodiments, the geometry of the target may be used to determine the visible region. For example, with cylindrical targets, cylinder geometry based parameters may be use to determine the angular range.

Next, in step 330, if the visible region of the model is point rich ("Y" in step 330), then, in step 333, threshold value T-Point may be set to "0.0", and the method proceeds to step 345. Otherwise ("N" in step 330), the method proceeds to step 335. Note that information in the previously stored table, which includes information pertaining to the number of point and/or line features for each image subdivision, may be used to determine if the visible region of the model is point rich. For example, in one embodiment, a sum or other function of the count of point features and the count of edge features associated with each grid in the visible region may be used to determine if the visible region of the model is point rich.

In step, 335, if the if the visible region of the model is "point poor" ("Y" in step 335), then, in step 337, threshold value T-Point may be set to "1.0" and the method proceeds to step 345. Otherwise ("N" in step 335), the method proceeds to step 340, where the value of threshold T-Point may be set to a number between 0.0 and 1.0 based on the number of point features detected in the modeled visible region. Note that information in the previously stored table may be used to determine if the modeled visible is point poor (in step 335) and/or to set a value of T-Point (in step 340).

Next, in step 345, if the modeled visible region is rich in line features i.e. line rich ("Y" in step 345), then in step 347, threshold value T-Line may be set to "0.6", and the method may proceed to step 365. Otherwise ("N" in step 345), the method may proceed to step 350. Information in the previously stored table which includes information pertaining to the number of point and/or line features for each image subdivision, may be used to determine if the modeled visible region is line rich.

In step, 350, if the modeled visible region is line poor ("Y" in step 350), then in step 357, threshold value T-Line may be set to "0.0" and the method may proceed to step 365. Otherwise ("N" in step 350), the method may proceed to step 360, where the value of threshold T-Line may be set to a number between 0.0 and 0.6 based on the number of line features detected in the image. Note that information in the previously stored table, which includes information pertaining to the number of point and/or line features for each image subdivision, may be used to determine may be used to determine if the modeled visible is point poor (in step 350) and/or to set a value of T-Line (in step 360).

In step 365, the value of T-Score that was computed in step 280 may be compared with T-Point. If T-Score≥T-Point ("Y" in step 365), then, in step 367 a determination to use only point features for a subsequent pose refinement step may be made and method 320 may invoke routine 297.

If T-Score<T-Point ("N" in step 365), then, in step 370 the value of T-Score (from step 280) may be compared with T-Line. If T-Score≤T-Line ("Y" in step 370), then, in step 377, a determination to use edge features for a subsequent pose refinement step may be made and method 320 may invoke routine 297.

Otherwise ("N" in step 370), in step 295, T-Line<T-Score<T-Point and a determination to use point and edges for the subsequent pose refinement step may be made and method 320 may invoke routine 297.

The values of thresholds T-Point and T-Line indicated above are exemplary and for illustrative purposes only. In general, the values selected for T-Point and T-Line may be varied depending on various system parameters and/or based on the modeled environment and/or varied to indicate a preference for point and/or line features.

In FIG. 3A, in exemplary method 300, in some instances, edge based features may not be added to point rich grids thus favoring point based feature tracking. Similarly, in FIG. 3B, in exemplary method 320, point based feature tracking is favored. Because T-Point=0.0 (in step 333) when a visible image region is point rich, the condition T-Score≥T-Point in step 365 is always satisfied for point rich visible regions, and point based feature tracking is selected when a visible image region is point rich.

However, in exemplary method 300, edge based features have been given greater weight than in the methods of FIGS. 2A and 2B. For example, T-Line=0.6 (in step 347) for a line rich visible region, so the condition T-Score≤T-Line in step 370 is more likely to be satisfied (relative to FIGS. 2A and 2B, where T-Line was assigned the value 0.4 for line rich regions). Thus, line features are more likely to be selected and/or used for feature tracking in step 377. Correspondingly, there is a lower likelihood of the use of both point and line features for tracking in step 380. Thus, the extent of selection/use of the various feature tracking methods may be optimally tailored based on system parameters.

In routine 297, the pose estimate may be refined based on the prior determination as made in one of steps 367, 377, or 380. For example, in one embodiment, a 6DOF camera pose may be estimated from the 2D-3D feature correspondences based on the determination as made in one of steps 367, 377, or 380. In some embodiments, weighted least squares approximation or variants thereof may be used to compute feature correspondences.

Figure 4A:
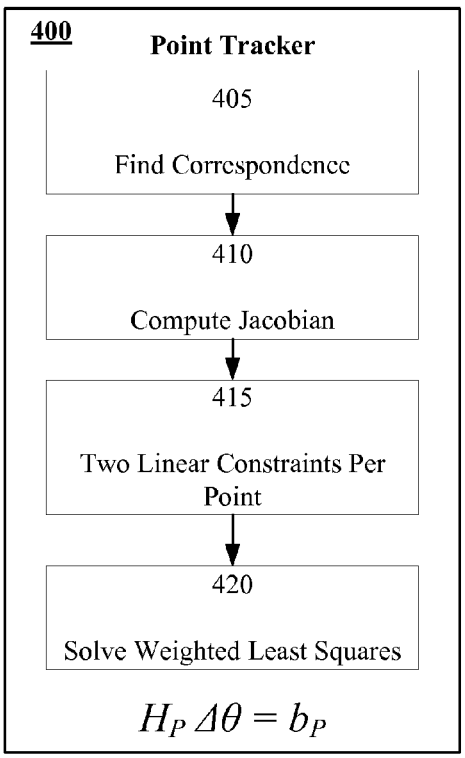
FIG. 4A shows a flowchart of an exemplary method to compute a refined pose using a point tracker in a manner consistent with disclosed embodiments.

FIG. 4A shows a flowchart of an exemplary method 400 to compute a refined pose using a point tracker. In some embodiments, portions of method 400 may be performed and/or invoked by routine 297, if point based features have been previously selected (in step 365) as a method for determining feature correspondence.

In step 405, feature correspondence may be determined by comparing the current image with existing features on the model using point based features based on the current estimated pose.

Next, in step 410, the Jacobian may be computed. The Jacobian $$J = \frac{\partial u}{\partial \theta}$$

describes the linear mapping between pose changes ($\Delta\theta$) to projected point changes ($\Delta u$).

$$J \cdot \Delta\theta = \Delta u = u_m - u_p \quad (1)$$

where, $\Delta\theta = (\Delta r_x, \Delta r_y, \Delta r_z, \Delta t_x, \Delta t_y, \Delta t_z)$ with 6 parameters pertains to rotation and translation in 3D space,
J is a 2×6 matrix, a partial differentiation of the measurement error with $\Delta\theta$ $$\begin{pmatrix} \frac{\delta u_x}{\delta r_x} & \frac{\delta u_x}{\delta r_y} & \frac{\delta u_x}{\delta r_z} & \frac{\delta u_x}{\delta t_x} & \frac{\delta u_x}{\delta t_y} & \frac{\delta u_x}{\delta t_z} \\ \frac{\delta u_y}{\delta r_x} & \frac{\delta u_y}{\delta r_y} & \frac{\delta u_y}{\delta r_z} & \frac{\delta u_y}{\delta t_x} & \frac{\delta u_y}{\delta t_y} & \frac{\delta u_y}{\delta t_z} \end{pmatrix}$$

u is the 2×1 measurement error vector $(u_x, u_y)^T$
$u_p$ is the projection of u,
$u_m$ is the measured or found correspondence.
Equation (1) may be used to compute the Jacobian in step 410.

Next, in step 415, since u is a 2×1 matrix and u can be computed per point, 2 linear constraints may be obtained per point. In step 420, with sufficient point correspondences, a weighted least squares (W.L.S) technique may be used to compute a solution for the pose update that minimizes ($\Delta u$) and brings all projections $u_p$ to the found correspondences $u_m$.

Therefore, a solution for the pose update that brings all projections $u_p$ to the found correspondences $u_m$, may be obtained with sufficient point/lines correspondences.
where, $$H_P = \Sigma J_P^T J_P \quad (2)$$

and $$b_P = \Sigma J_P^T u_p \Delta \quad (3)$$

Equations (2) and (3) above may be used to compute a pose update.

Figure 4B:
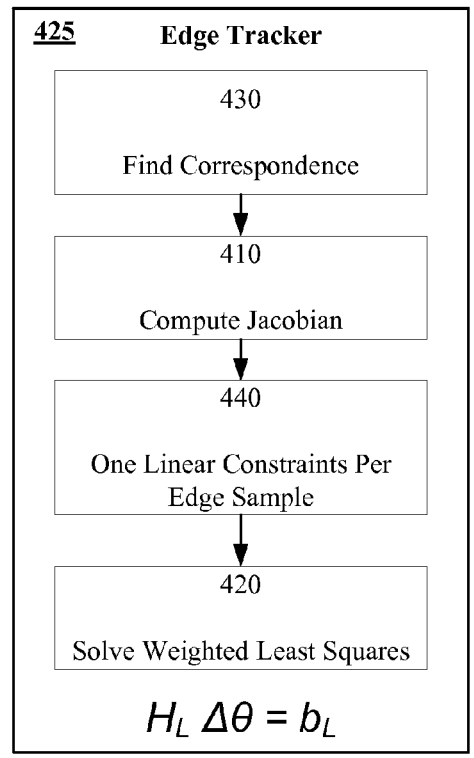
FIG. 4B shows a flowchart of an exemplary method to compute a refined pose using a line tracker in a manner consistent with disclosed embodiments.

FIG. 4B shows a flowchart of an exemplary method 400 to compute a refined pose using a line tracker. In some embodiments, portions of method 400 may be performed by routine 297, if edge based features have been previously selected as a method for determining feature correspondence.

In step 430, feature correspondence may be determined by comparing the current image with existing features on the model using edge based features. Next, in step 410, the Jacobian may be computed using equation (1).

In step 440, for edge pixels, the normal distance may be minimized so that each edge gives 1 linear constraint given by equation (4) below.

$$n^T \cdot J \cdot \Delta\theta = n^T \cdot u \Delta \quad (4)$$

where, $n = (n_x, n_y)^T$ is a normal vector of u when u is projected onto the image plane.

Therefore, a solution for the pose update that brings all projections $u_p$ to the found correspondences $u_m$, may be obtained with sufficient line correspondences using equations (5) and (6) below.

$$H_L \Delta\theta = \Sigma J_l^T n_l \cdot n_l^T J_l \quad (5)$$

where $$b_L = \Sigma J_l^T n_l \cdot n_l^T u_l \Delta \quad (6)$$

for all l line correspondences. Equations (5) and (6) above may be used to compute a pose update.

Figure 4C:
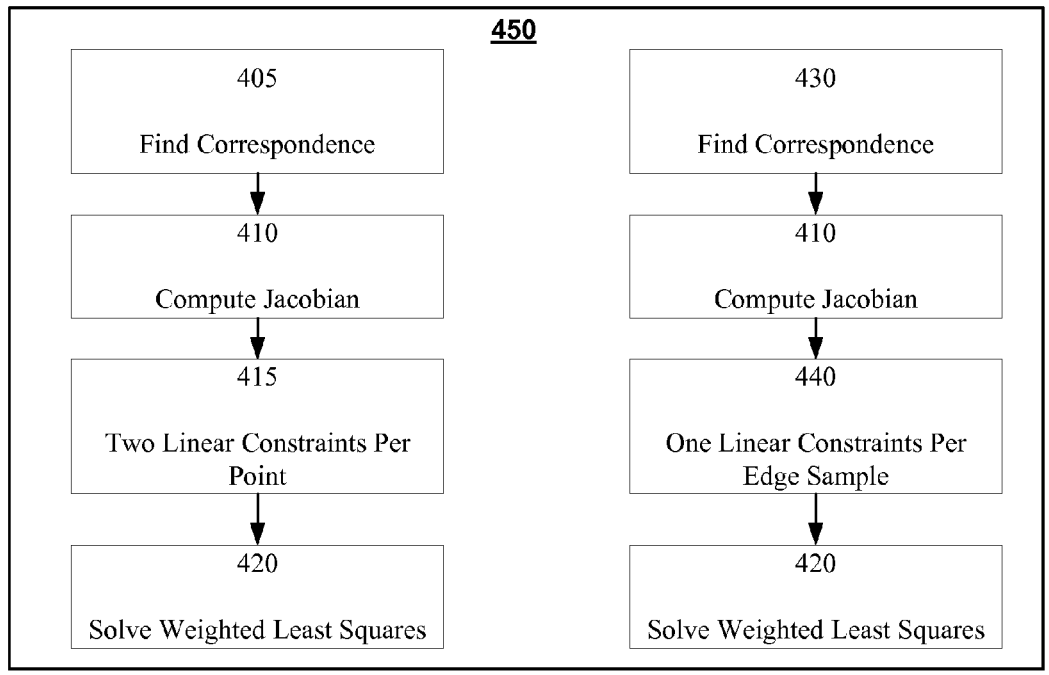
FIG. 4C shows a flowchart of an exemplary method to compute a refined using both a point and line tracker in a manner consistent with disclosed embodiments.

FIG. 4C shows a flowchart of an exemplary method 450 to compute a refined pose using both a point and line tracker. In some embodiments, portions of method 400 may be performed by routine 297, if point and edge based features have been previously selected as a method for determining feature correspondence.

In steps 405 and 430, feature correspondences may be determined by comparing the current image with existing features on the model using point and edge based features. For example, a point tracker and an edge tracker may operate on the image to determined correspondences.

Next, in steps 410, the Jacobian may be computed using equation (1). In step 415, 2 linear constraints may be obtained per point, and in step 440, 1 linear constraint per line may be obtained given by equation (4) above.

Therefore, a solution for the pose update that brings all projections $u_p$ to the found correspondences $u_m$, may be obtained with sufficient point and line correspondences using equations (3) and (6) above and equation (7) below.

$$(\lambda_P H_P + \lambda_L H_L)\Delta\theta = \lambda_P b_P \lambda_L + b_L \quad (7)$$

where $\lambda_P = 1$, and $\lambda_L$ are weights assigned to points and lines, respectively. Equations (3), (6) and (7) may be used to compute a pose update.

In some embodiments, the methods described above facilitate adapting of thresholds to targets and consequently optimize the run time of the disclosed methods and enhance the stability of the feature tracker.

Embodiments disclosed herein facilitate accurate and robust tracking for a variety of targets, including 3D targets and permit tracking with 6-DoF. Disclosed embodiments facilitate accurate tracking in the presence of unexpected inter-frame motion, varying illumination, and aspect changes thereby improving tracking robustness. The methodologies described herein may be implemented by various means depending upon the application. For example, for a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software code may be stored in a memory and executed by a processor unit. In some embodiments, the functions may be stored as one or more instructions or code on a computer-readable medium. Examples include computer-readable media encoded with a data structure and computer-readable media encoded with a computer program. Computer-readable media includes physical computer storage media.

A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 5:
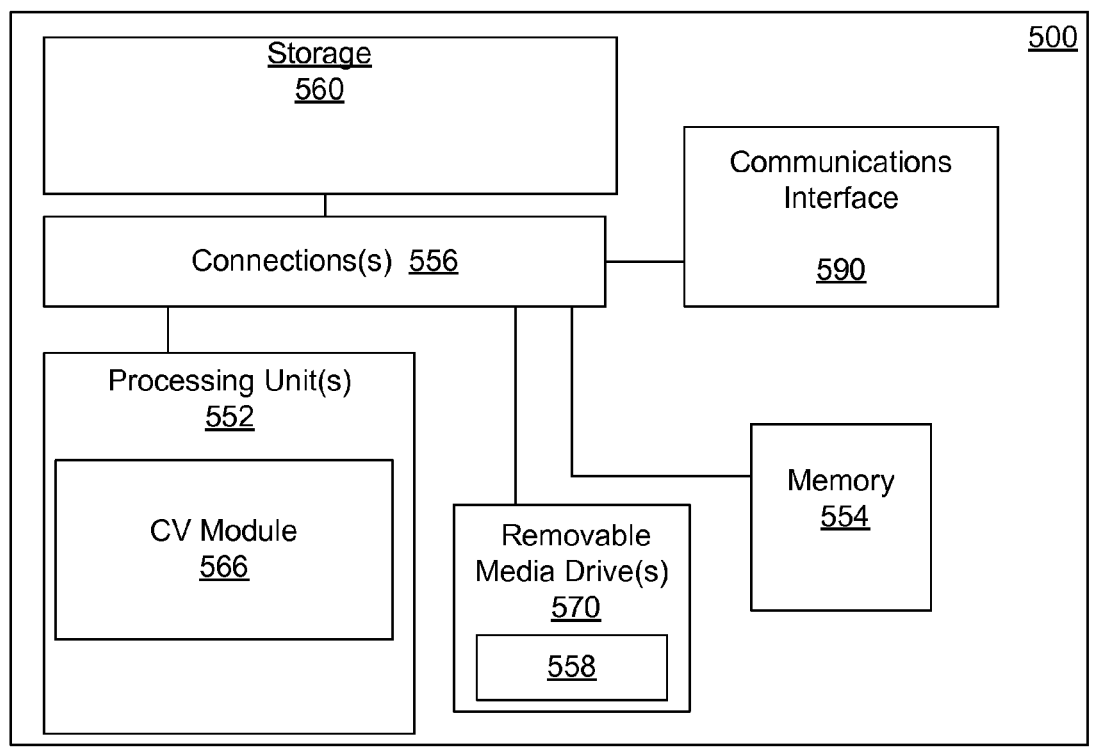
FIG. 5 shows a schematic block diagram of an exemplary computing device enabled to facilitate robust feature based tracking using point and line features in a manner consistent with disclosed embodiments.

Reference is now made to FIG. 5, which is a schematic block diagram illustrating a computing device 500 enabled to facilitate robust feature based tracking using point and line features in a manner consistent with disclosed embodiments. In some embodiments, computing device 500 may take the form of a server. In some embodiments, computing device 500 may include, for example, one or more processing units 552, memory 554, storage 560, and (as applicable) communications interface 590 (e.g., wireline or wireless network interface), which may be operatively coupled with one or more connections 556 (e.g., buses, lines, fibers, links, etc.). In certain example implementations, some portion of computing device 500 may take the form of a chipset, and/or the like. In some embodiments, computing device 500 may be wirelessly coupled to one or more UD's 100 over a wireless network (not shown), which may one of a WWAN, WLAN or WPAN.

In some embodiments, computing device 500 may perform portions of the methods 200, 275, 300, 320, 400, 425, and/or 450. In some embodiments, the above methods may be performed by processing units 552 and/or Computer Vision (CV) module 566. For example, the above methods may be performed in whole or in part by processing units 552 and/or CV module 566 in conjunction with one or more functional units on computing device 500 and/or in conjunction with UD 100. For example, computing device 500 may receive a sequence of captured images from UD 100 and may perform portions of one or more of methods 200, 275, 300, 320, 400, 425, and/or 450 in whole, or in part, using CV module 566 using a model of the environment stored in memory 554.

Communications interface 590 may include a variety of wired and wireless connections that support wired transmission and/or reception and, if desired, may additionally or alternatively support transmission and reception of one or more signals over one or more types of wireless communication networks. Communications interface 590 may include interfaces for communication with UD 100 and/or various other computers and peripherals. For example, in one embodiment, communications interface 590 may comprise network interface cards, input-output cards, chips and/or ASICs that implement one or more of the communication functions performed by computing device 500. In some embodiments, communications interface 590 may also interface with UD 100 to send 3D model information for an environment, and/or receive images, data and/or instructions related to methods 200, 275, 300, 320, 400, 425 and/or 450.

Processing units 552 may use some or all of the received information to perform the requested computations and/or to send the requested information and/or results to UD 100 via communications interface 590. In some embodiments, processing units 552 may be implemented using a combination of hardware, firmware, and software. In some embodiments, processing unit 552 may include CV Module 566, which may generate and/or process 3D models of the environment, perform 3D reconstruction, implement and execute various computer vision methods such as methods 200, 275, 300, 320, 400, 425, and/or 450. In some embodiments, processing unit 552 may represent one or more circuits configurable to perform at least a portion of a data signal computing procedure or process related to the operation of computing device 500.

For example, CV module 566 may implement feature-based tracking using a combination of point and line features by processing one or more image frames received from UD 100 in a manner consistent with disclosed embodiments. In some embodiments, CV module 566 may perform one or more of image analysis, model creation, feature extraction, target tracking, feature correspondence, camera pose determination using both point and line features, and/or 3D reconstruction of an environment based on received images. In some embodiments, one or more of the methods above may be invoked during the course of execution of various AR applications.

The methodologies described herein in flow charts and message flows may be implemented by various means depending upon the application. For example, these methodologies may be implemented in hardware, firmware, software, or any combination thereof. For a hardware implementation, the processing unit 552 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in removable media drive 570, which may support the use of non-transitory computer-readable media 558, including removable media. Program code may be resident on non-transitory computer readable media 558 or memory 554 and may be read and executed by processing units 552. Memory may be implemented within processing units 552 or external to the processing units 552. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 558 and/or memory 554. Examples include computer-readable media encoded with a data structure and computer-readable media encoded with a computer program. For example, non transitory computer-readable medium 558 including program code stored thereon may include program code to facilitate robust feature based tracking in a manner consistent with disclosed embodiments.

Non-transitory computer-readable media may include a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 590, which may store the instructions/data in memory 554, storage 560 and/or relayed the instructions/data to processing units 552 for execution. For example, communications interface 590 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 554 may represent any data storage mechanism. Memory 554 may include, for example, a primary memory and/or a secondary memory. Primary memory may include, for example, a random access memory, read only memory, non-volatile RAM, etc. While illustrated in this example as being separate from processing unit 552, it should be understood that all or part of a primary memory may be provided within or otherwise co-located/coupled with processing unit 552. Secondary memory may include, for example, the same or similar type of memory as primary memory and/or storage 560 such as one or more data storage devices 560 including, for example, hard disk drives, optical disc drives, tape drives, a solid state memory drive, etc.

In some embodiments, storage 560 may comprise one or more databases that may hold information pertaining to an environment, including 3D models, images, databases and/or tables associated with stored models, keyframes, information pertaining to virtual objects, etc. In some embodiments, information in the databases may be read, used and/or updated by processing units 552 and/or CV module 566 during various computations.

In certain implementations, secondary memory may be operatively receptive of, or otherwise configurable to couple to a non-transitory computer-readable medium 558. As such, in certain example implementations, the methods and/or apparatuses presented herein may be implemented in whole or in part using non transitory computer readable medium 558 that may include with computer implementable instructions stored thereon, which if executed by at least one processing unit 552 may be operatively enabled to perform all or portions of the example operations as described herein. In some embodiments, computer readable medium 558 may be read using removable media drive 570 and/or may form part of memory 554.

Figure 6:
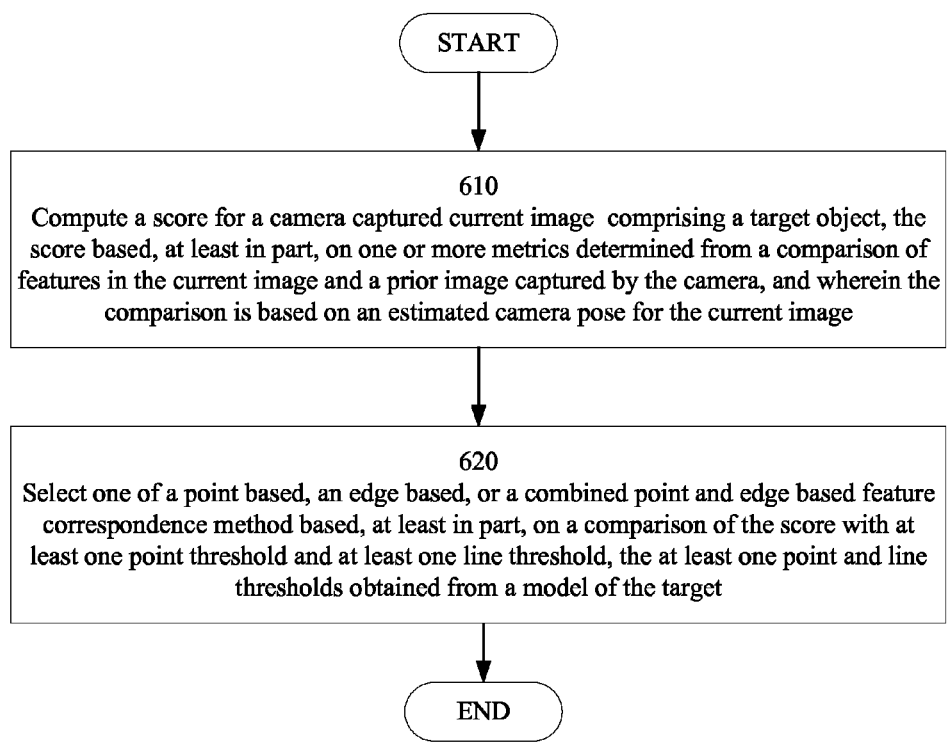
FIG. 6 shows a flowchart for an exemplary method for feature tracking based on a combination of point and line features in a manner consistent with disclosed embodiments.

FIG. 6 shows a flowchart for an exemplary method 600 for feature tracking based on a combination of point and line features in a manner consistent with disclosed embodiments.

In some embodiments, in step 610, a score for a current camera-captured image comprising a target object may be computed. The score may be based, at least in part, on one or more metrics determined from a comparison of features in the current image and a prior image captured by the camera, and the comparison may be based on an estimated camera pose for the current image. In some embodiments, the estimated camera pose for the current image may be obtained based, at least in part, on a prior camera pose obtained for the prior image and on an estimated location of the target object in the current image. The one or more metrics may comprise at least one of: a number of feature matches between the current image and the prior image; a proportion of feature matches relative to an expected number of feature matches between the current image and the prior image; or an average Normalized Cross Correlation (NCC) score for feature point matches between the current image and the prior image.

Next, in step 620, one of a point based, an edge based, or a combined point and edge based feature correspondence method may be selected based, at least in part, on a comparison of the score with at least one point threshold and at least one line threshold, wherein the at least one point threshold and the at least one line threshold are obtained from a model of the target. In some embodiments, the at least one point threshold may provide an indication of suitability of the model for point based feature tracking, and the at least one line threshold may provide an indication of suitability of the model for line based feature tracking.

In some embodiments, feature correspondences between the current image and at least one model image may be determined using the selected feature correspondence method, where the model image may be selected based on the estimated camera pose. The estimated camera pose may then be refined based on the feature correspondences obtained between the current image and the at least one model image by using a weighted least squares approximation.

In some embodiments, the model of the target may comprise a plurality of stored images of the target object. In some embodiments, each stored image of the target object may comprise a plurality of image subdivisions and each image subdivision may be associated with a count of point features and a count of edge features. Further, the at least one point threshold and the at least one line threshold may be obtained from a visible region of the model based, at least in part, on the count of point features and the count of edge features associated with each image subdivision in the visible region, wherein the visible region of the model corresponds to the current image. In some embodiments, each image subdivision may take the form of a grid obtained by subdividing each image in the model into a plurality of grids.

In embodiments where the model of the target comprises a plurality of stored images of the target, each with a plurality of image subdivisions, the one or more metrics may be based further on: the uniformity of a spatial distribution of point matches between the current and the prior image.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method of object tracking comprising:
    computing a score for a camera captured current image comprising a target object, the score based, at least in part, on one or more metrics determined from a comparison of features in the current image and a prior image captured by the camera, and wherein the comparison is based on an estimated camera pose for the current image; and
    selecting one of a point based, an edge based, or a combined point and edge based feature correspondence method based, at least in part, on a comparison of the score with at least one point threshold and at least one line threshold, the at least one point threshold and the at least one line threshold obtained from a model of the target.

2. The method of claim 1, wherein the one or more metrics comprise at least one of:
    a number of feature matches between the current image and the prior image;
    a proportion of feature matches relative to an expected number of feature matches between the current image and the prior image; or
    an average Normalized Cross Correlation (NCC) score for feature point matches between the current image and the prior image.

3. The method of claim 1, wherein the model of the target comprises a plurality of stored images of the target object.

4. The method of claim 3, further comprising:
    determining feature correspondences between the current image and at least one model image using the selected feature correspondence method, the model image being selected based on the estimated camera pose, and
    refining the estimated camera pose based on the feature correspondences obtained between the current image and the at least one model image by using a weighted least squares approximation.

5. The method of claim 3, wherein:
    each stored image of the target object comprises a plurality of image subdivisions, each image subdivision being associated with a count of point features and a count of edge features, and,
    wherein the at least one point threshold and the at least one line threshold are obtained from a visible region of the model based, at least in part, on the count of point features and the count of edge features associated with each image subdivision in the visible region, wherein the visible region of the model corresponds to the current image.

6. The method of claim 5, wherein the each image subdivision is a grid obtained by subdividing each image in the model into a plurality of grids.

7. The method of claim 5, wherein the one or more metrics comprise:
    a uniformity of a spatial distribution of point matches between the current and the prior image;
    a number of good matches between the current and the prior image;
    a number of bad matches between the current and the prior image;
    a proportion of feature matches relative to an expected number of feature matches between the current image and the prior image; or
    an average Normalized Cross Correlation (NCC) score for feature point matches between the current image and the prior image.

8. The method of claim 1, wherein the estimated camera pose for the current image is obtained based, at least in part, on a prior camera pose obtained for the prior image and on an estimated location of the target object in the current image.

9. The method of claim 1, wherein:
    the at least one point threshold provides an indication of suitability of the model for point based feature tracking, and
    the at least one line threshold provides an indication of suitability of the model for line based feature tracking.

10. A User device (UD) comprising:
    a camera configured to capture a plurality of images of comprising a target object,
    a memory configured to store a model of the target object, and
    a processor coupled to the camera and the memory, the processor configured to:
        compute a score for a current image captured by the camera, the score based, at least in part, on one or more metrics determined from a comparison of features in the current image and a prior image captured by the camera, and wherein the comparison is based on an estimated camera pose for the current image; and
        select one of a point based, an edge based, or a combined point and edge based feature correspondence method based, at least in part, on a comparison of the score with at least one point threshold and at least one line threshold, the at least one point threshold and the at least one line threshold obtained from the model of the target object.

11. The UD of claim 10, wherein the one or more metrics comprise at least one of:
    a number of feature matches between the current image and the prior image;
    a proportion of feature matches relative to an expected number of matches between the current image and the prior image; or
    an average Normalized Cross Correlation (NCC) score for feature point matches between the current image and the prior image.

12. The UD of claim 10, wherein the model of the target object comprises a plurality of stored images of the target object.

13. The UD of claim 12, wherein the processor is further configured to:
    determine feature correspondences between the current image and at least one model image using the selected feature correspondence method, the model image being selected based on the estimated camera pose, and
    refine the estimated current camera pose based on the feature correspondences obtained between the current image and the at least one model image by using a weighted least squares approximation.

14. The UD of claim 12, wherein:
  each of the plurality of stored images of the target object comprises a plurality of image subdivisions, each image subdivision being associated with a count of point features and a count of edge features, and,
  wherein the processor is further configured to:
  obtain the at least one point threshold and the at least one line threshold from a visible region of the model based, at least in part, on the count of point features and the count of edge features associated with each image subdivision in the visible region, the visible region of the model corresponding to the current image.

15. The UD of claim 14, wherein the each image subdivision is a grid obtained by subdividing each image in the model into a plurality of grids.

16. The UD of claim 14, wherein metrics comprise:
  a uniformity of a spatial distribution of feature point matches between the current image and the prior image;
  a number of feature matches between the current image and the prior image;
  a proportion of feature matches relative to an expected number of feature matches between the current image and the prior image; or
  an average Normalized Cross Correlation (NCC) score for feature point matches between the current image and the prior image.

17. The UD of claim 10, wherein the processor is further configured to:
  determine the estimated camera pose for the current image based, at least in part, on a prior camera pose obtained for the prior image and on an estimated location of the target object in the current image.

18. The UD of claim 10, wherein:
  the at least one point threshold provides an indication of suitability of the model for point based feature tracking, and
  the at least one line threshold provides an indication of suitability of the model for edge based feature tracking.

19. An apparatus comprising:
  imaging means for capturing a plurality of images of comprising a target object;
  storage means for storing a model of the target object, the storage means coupled to the imaging means;
  means for computing a score for a current image captured by the imaging means, the score based, at least in part, on one or more metrics determined from a comparison of features in the current image and a prior image captured by the imaging means, and wherein the comparison is based on an estimated imaging means pose for the current image; and
  means for selecting one of a point based, an edge based, or a combined point and edge based feature correspondence method based, at least in part, on a comparison of the score with at least one point threshold and at least one line threshold, the at least one point threshold and the at least one line threshold obtained from the stored model of the target object.

20. The apparatus of claim 19, wherein the one or more metrics comprise at least one of:
  a number of feature matches between the current image and the prior image;
  a proportion of feature matches relative to an expected number of matches between the current image and the prior image; or
  an average Normalized Cross Correlation (NCC) score for point matches between the current image and the prior image.

21. The apparatus of claim 19, wherein the model of the target object comprises a plurality of images of the target object.

22. The apparatus of claim 21, further comprising:
  means for determining feature correspondences between the current image and at least one model image using the selected feature correspondence method, the model image being selected based on the current camera pose, and
  means for refining the estimated current imaging means pose based on the feature correspondences obtained between the current image and the at least one model image by using a weighted least squares approximation.

23. The apparatus of claim 21, wherein:
  each of the plurality of images of the target object comprises a plurality of image subdivisions, each image subdivision being associated with a count of point features and a count of edge features, and,
  wherein the apparatus further comprises:
  means for obtaining the at least one point threshold and the at least one line threshold from a visible region of the model based, at least in part, on the count of point features and the count of edge features associated with each image subdivision in the visible region, the visible region of the model corresponding to the current image.

24. The apparatus of claim 23, wherein metrics comprise:
  a uniformity of a spatial distribution of feature point matches between the current image and the prior image;
  a number of feature matches between the current image and the prior image;
  a proportion of feature matches relative to an expected number of feature matches between the current image and the prior image; or
  an average Normalized Cross Correlation (NCC) score for feature point matches between the current image and the prior image.

25. A non-transitory computer-readable medium comprising instructions, which when executed by a processor perform steps in a method comprising:
  computing a score for a camera captured current image comprising a target object, the score based, at least in part, on one or more metrics determined from a comparison of features in the current image and a prior image captured by the camera, and wherein the comparison is based on an estimated camera pose for the current image; and
  selecting one of a point based, an edge based, or a combined point and edge based feature correspondence method based, at least in part, on a comparison of the score with at least one point threshold and at least one line threshold, the at least one point threshold and the at least one line threshold obtained from a model of the target object.

26. The computer-readable medium of claim 25, wherein metrics comprise at least one of:
  a number of feature matches between the current image and the prior image;
  a proportion of feature matches relative to an expected number of feature matches between the current image and the prior image; or
  an average Normalized Cross Correlation (NCC) score for feature point matches between the current image and the prior image.

27. The computer-readable medium of claim 25, wherein the model comprises a plurality of stored images of the target object.

28. The computer-readable medium of claim 27, further comprising:
- determining feature correspondences between the current image and at least one model image using the selected feature correspondence method, the model image being selected based on the estimated camera pose, and
- refining the estimated camera pose based on the feature correspondences obtained between the current image and the at least one model image by using a weighted least squares approximation.

29. The computer-readable medium of claim 27, wherein: each stored image comprises a plurality of image subdivisions, each image subdivision being associated with a count of point features and a count of edge features, and, wherein the at least one point threshold and the at least one line threshold are obtained from a visible region of the model based, at least in part, on the count of point features and the count of edge features associated with each image subdivision in the visible region, wherein the visible region of the model corresponds to the current image.

30. The computer-readable medium of claim 29, wherein the one or more metrics comprise:
- a uniformity of a spatial distribution of point matches between the current image and the prior image;
- a number of feature matches between the current image and the prior image;
- a proportion of feature matches relative to an expected number of feature matches between the current image and the prior image; or
- an average Normalized Cross Correlation (NCC) score for point matches between the current image and the prior image.

* * * * *